US010834005B2

(12) United States Patent
Gopalarathnam et al.

(10) Patent No.: US 10,834,005 B2
(45) Date of Patent: Nov. 10, 2020

(54) BUFFER SHORTAGE MANAGEMENT SYSTEM

(71) Applicant: Dell Products L.P., Round Rock, TX (US)

(72) Inventors: Sudharsan Dhamal Gopalarathnam, Chennai (IN); Anbalagan Natchimuthu, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 16/042,736

(22) Filed: Jul. 23, 2018

(65) Prior Publication Data

US 2020/0028790 A1    Jan. 23, 2020

(51) Int. Cl.
| H04L 12/00  | (2006.01) |
| H04L 12/835 | (2013.01) |
| H04L 12/801 | (2013.01) |
| H04L 12/815 | (2013.01) |
| H04L 12/891 | (2013.01) |

(52) U.S. Cl.
CPC .............. *H04L 47/30* (2013.01); *H04L 47/11* (2013.01); *H04L 47/22* (2013.01); *H04L 47/33* (2013.01); *H04L 47/41* (2013.01)

(58) Field of Classification Search
CPC ......... H04L 47/11; H04L 47/22; H04L 47/30; H04L 47/33; H04L 47/41; H04L 47/10; H04L 47/125; G10L 19/005
See application file for complete search history.

(56) References Cited

U.S. PATENT DOCUMENTS

| 5,862,128 A   | * | 1/1999  | Cooperman | ........... | H04L 45/302 |
|               |   |         |           |             | 370/229     |
| 2011/0205985 A1 | * | 8/2011  | Kim       | ......... | H04L 47/10  |
|               |   |         |           |             | 370/329     |
| 2018/0069790 A1 | * | 3/2018  | Mitsumori | .............. | H04L 45/74 |
| 2018/0091387 A1 | * | 3/2018  | Levi      | ..................... | H04L 67/1095 |
| 2018/0285151 A1 | * | 10/2018 | Wang      | .................... | G06F 9/5083 |
| 2019/0089627 A1 | * | 3/2019  | Mirsky    | ................. | H04L 45/245 |

* cited by examiner

*Primary Examiner* — Phuc H Tran
(74) *Attorney, Agent, or Firm* — Haynes and Boone, LLP (57) ABSTRACT

A buffer shortage management system includes a first networking device with ports included in a buffer pool. A second networking device forwards a first data flow to the first networking device through LAG port(s) in the buffer pool. The first networking device determines that a total buffer pool utilization has reached a threshold that effects a first data flow received through a non-LAG port on the first networking device. The first networking device then identifies that the first data flow and third data flow(s) are received through the LAG port(s), determines that the first data flow has a higher utilization of the buffer pool than the third data flow(s) and, in response, transmits a first buffer shortage notification to the second networking device that causes the second networking device to modify its forwarding parameters to redirect the first data flow from the first networking device to a third networking device.

20 Claims, 10 Drawing Sheets

BUFFER SHORTAGE MANAGEMENT SYSTEM

BACKGROUND

The present disclosure relates generally to information handling systems, and more particularly to managing buffer shortages in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art, sometimes utilize data buffers to temporarily store data for subsequent routing of that data through a network. For example, different data flows may have their data temporarily stored in a data buffer of a networking device as part of a buffer pool, with the memory of the networking device configured with a plurality of different buffer pools (e.g., a lossless buffer pool, a "lossy" buffer pool, etc.). However, in relatively high data traffic situations, the utilization of a buffer pool in a networking device may reach a level that impacts data flows network-wide and across multiple buffer pools/data queues provided for different networking device ports. Conventional solutions to such network congestion include mechanisms such as Priority Flow Control (PFC), which prioritizes particular data flows over others and, as such, is only enabled for particular buffer pools/data queues, which can still result in disruptions across different data flows. Another conventional solution to network congestion includes Explicit Congestion Notification (ECN), which provides for the identification of congestion in the packet that is sent to the destination, and results in the destination sending a packet back to the sender that causes the sender to re-route its data flow. However, ECN requires hardware support, and is associated with delayed congestion remediation due to the need to first inform the destination, and for the destination to then inform the source of the congestion.

Accordingly, it would be desirable to provide an improved buffer shortage management system.

SUMMARY

According to one embodiment, an information handling system includes a processing system; and a memory system that is coupled to the processing system and that includes instructions that, when executed by the processing system, cause the processing system to provide a buffer shortage management engine that is configured to: determine that a total buffer pool utilization of a buffer pool in a buffer has reached a buffer pool utilization threshold that effects a first data flow received through a non-Link Aggregation Group (LAG) port; identify that a second data flow and at least one third data flow are received via a LAG and through at least one LAG port; determine that the second data flow has a higher relative utilization of the buffer pool than any of the at least one third data flows; and transmit, in response to determining that the second data flow has a higher relative utilization of the buffer pool than any of the at least one third data flows, a first buffer shortage notification to a connected networking device that is configured to cause the connected networking device to redirect the second data flow such that it is not received via the at least one LAG port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
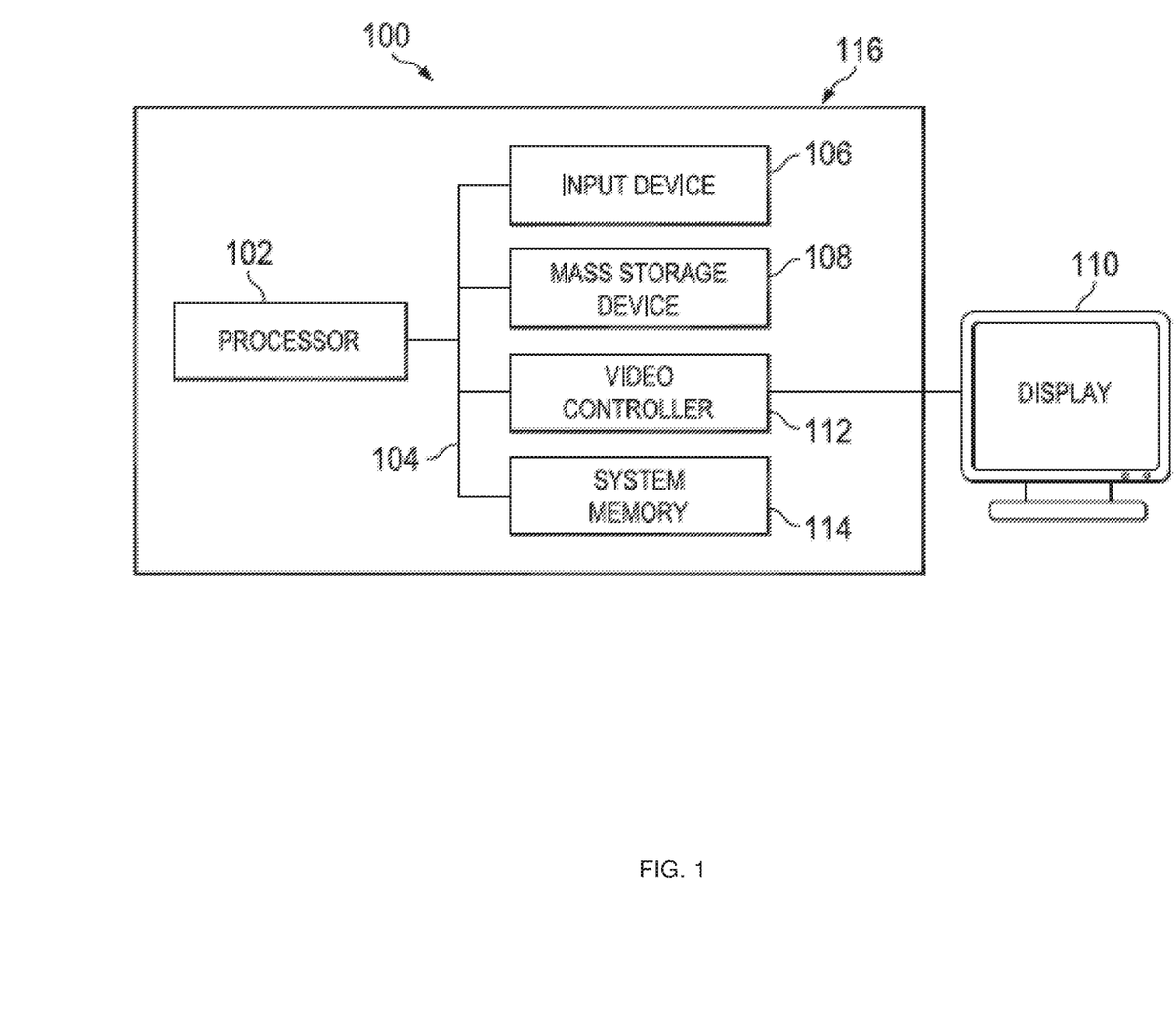
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
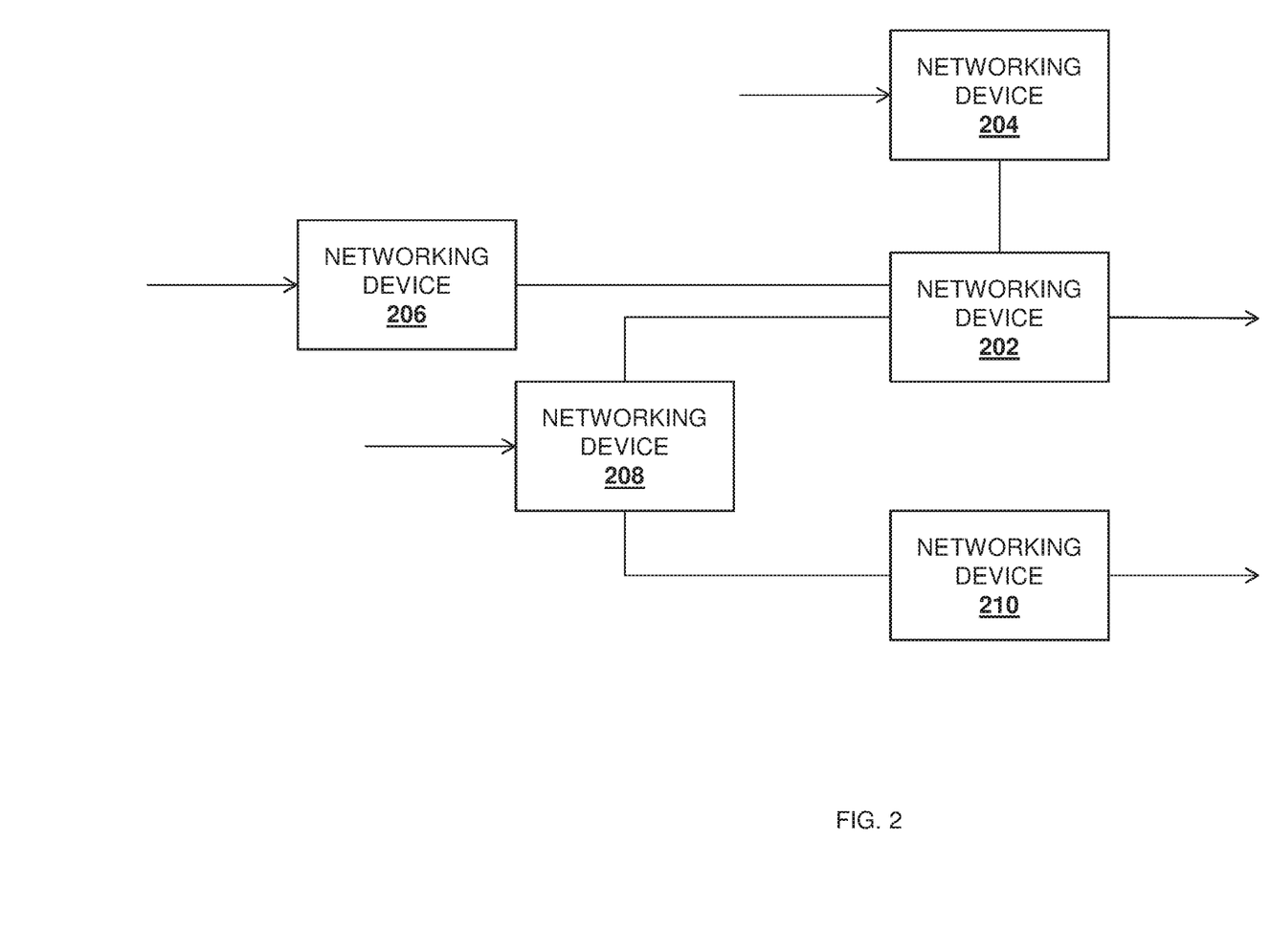
FIG. 2 is a schematic view illustrating an embodiment of a buffer shortage management system.

Referring now to FIG. 2, an embodiment of a buffer shortage management system 200 is illustrated. In the illustrated embodiment, the buffer shortage management system 200 includes a plurality of networking devices, and one of skill in the art in possession of the present disclosure will recognize that the networking devices may be coupled to server devices, client devices, storage devices, and/or any other devices that would be apparent to one of skill in the art in possession of the present disclosure. Any or all of the networking devices in the buffer shortage management system 200 may be provided by the IHS 100 discussed above with reference to FIG. 1, and/or may include some or all of the components of the IHS 100. In specific examples, any or all of those networking devices may be provided by a switch device, a router device, and/or other networking devices that would be apparent to one of skill in the art in possession of the present disclosure.

In the examples provided below, the buffer shortage management system 200 includes a networking device 202 that is described as performing the buffer shortage management taught by the present disclosure. The networking device 202 is coupled to a networking device 204 that, in the examples discussed below, receives at least one data flow (as illustrated by the arrow connected to the networking device 204), and provides that at least one data flow to the networking device 202. The networking device 202 is also coupled to a networking device 206 that, in the examples discussed below, receives at least one data flow (as illustrated by the arrow connected to the networking device 206), and provides that at least one data flow to the networking device 202. The networking device 202 is also coupled to a networking device 208 that, in the examples discussed below, receives at least one data flow (as illustrated by the arrow connected to the networking device 208), and provides that at least one data flow to the networking device 202. As discussed below, the networking device 202 may forward any data flows received from the networking devices 204, 206, and 208 to one or more connected devices (as illustrated by the arrow connected to the networking device 202.) Furthermore, a networking device 210 is coupled to the networking device 208, and may forward any data flows received from the networking device 208 to one or more connected devices (as illustrated by the arrow connected to the networking device 210.) However, while a specific buffer shortage management system 200 is illustrated and described, one of skill in the art in possession of the present disclosure will recognize that buffer shortage management systems according to the teachings of the present disclosure may include different devices, different numbers of devices, and different device configurations, while remaining within the scope of the present disclosure as well.

Figure 3:
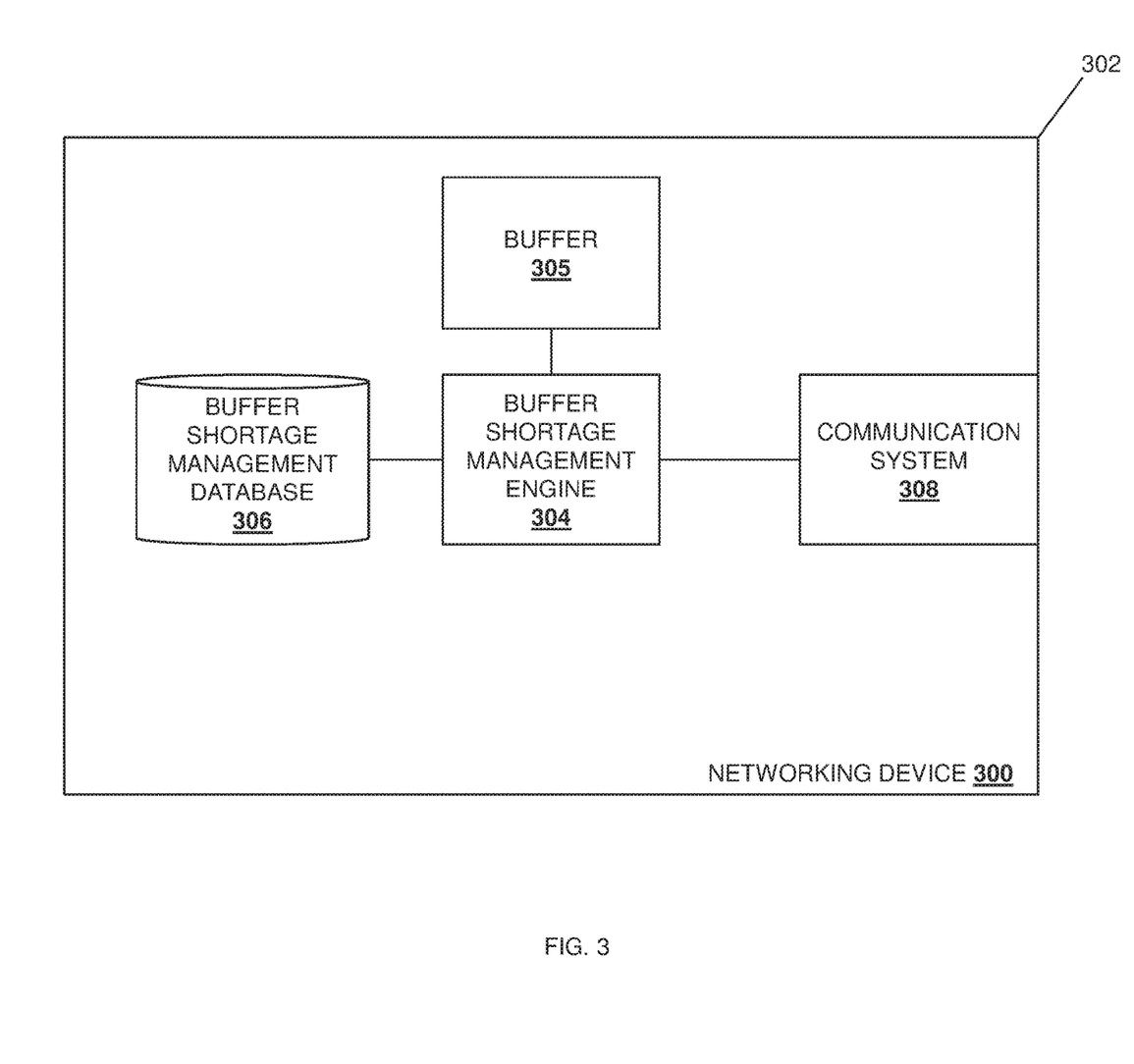
FIG. 3 is a schematic view illustrating an embodiment of a networking device used in the buffer shortage management system of FIG. 2.

Referring now to FIG. 3, an embodiment of a networking device 300 is illustrated that may be any or all of the networking devices 202-210 discussed above with reference to FIG. 2. As such, the networking device 300 may be provided by the IHS 100 discussed above with reference to FIG. 1, and/or may include some or all of the components of the IHS 100, and in specific examples may be provided by a switch device, a router device, and/or other networking devices that would be apparent to one of skill in the art in possession of the present disclosure. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is couple to the processing system and that include instructions that, when executed by the processing system, cause the processing system to provide a buffer shortage management engine 304 that is configured to perform the functionality of the buffer shortage management engines and networking devices discussed below. The chassis 302 also includes a buffer 305 that is coupled to the buffer shortage management engine 304 (e.g., via a coupling between the buffer 305 and the processing system) and that may be provided by a region of a memory system (not illustrated, but which may include the memory 114 discussed above with reference to FIG. 1) that is configured to temporarily store data that is received by the networking device 300 for transmitted to a connected device (e.g., via the communication system 308 discussed below.).

The chassis 302 may also house a storage device (not illustrated, but which may include the storage device 108 discussed above with reference to FIG. 1) that is coupled to the buffer shortage management engine 304 (e.g., via a coupling between the storage system and the processing system) and that stores a buffer shortage management database 306 that is configured to store any of the information utilized as discussed below. The chassis 302 may also house a communication system 308 that is coupled to the buffer shortage management engine 304 (e.g., via a coupling between the communication system 308 and the processing system), and that may be provided by a Network Interface Controller (NIC), a wireless communication system (e.g., a BLUETOOTH® communication system, a Near Field Communication (NFC) system, etc.), and/or other communication components that would be apparent to one of skill in the art in possession of the present disclosure. While a specific networking device 300 has been illustrated and described, one of skill in the art in possession of the present disclosure will recognize that networking devices may include variety of components and/or component configurations for providing conventional networking device functionality, as well as the functionality described below, while remaining within the scope of the present disclosure.

Figure 4:
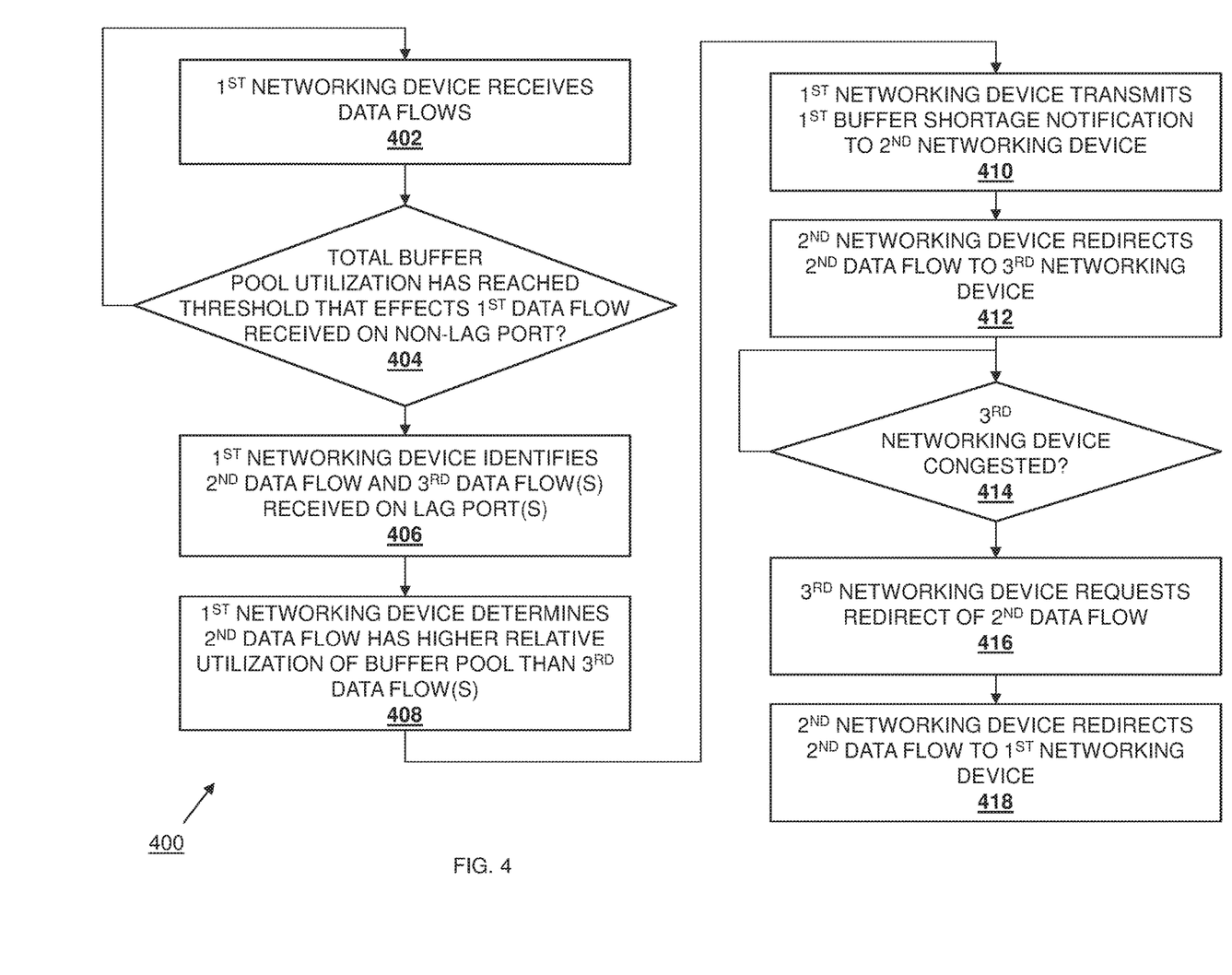
FIG. 4 is a flow chart illustrating an embodiment of a method for managing a buffer shortage.

Referring now to FIG. 4, a method 400 for managing buffer shortages is illustrated. As discussed below, the systems and methods of the present disclosure address system wide congestion issues that can affect particular data flows by modifying the routing of unrelated data flows. In some embodiments, this may be achieved by a first networking device determining that a total buffer pool utilization of a buffer pool has reached a threshold that effects a first data flow received on a non-LAG port and, in response, identifying a second data flow and third data flow(s) that are received on LAG ports. The first networking device may then determine that the second data flow has a higher relative utilization of the buffer pool than the third data flow(s) and, in response, may transmit a first buffer shortage notification to the second networking device forwarding the second data flow to the first networking device. The buffer shortage notification is configured to cause the second networking device to redirect the second data flow to a third networking device, thus reducing the utilization of the buffer pool in the first networking device. As such, buffer shortages in a buffer pool that may affect a particular data flow may be remedied by causing connected networking devices to redirect unrelated data flows, remedying the buffer shortage and ensuring that the particular data flow is not delayed or otherwise negative effected.

Figure 5A:
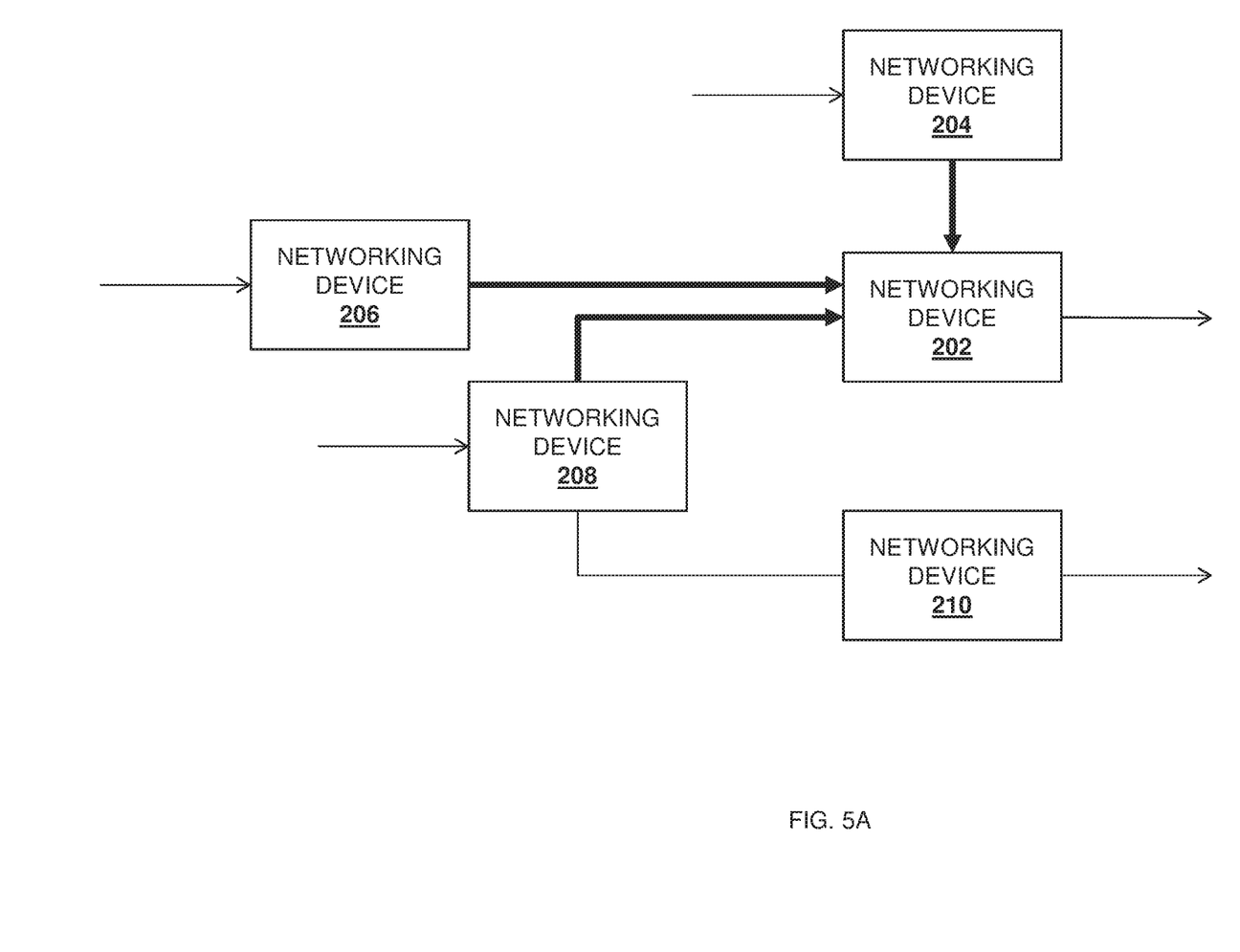
FIG. 5A is a schematic view illustrating an embodiment of data flows in the buffer shortage management system of FIG. 2.

The method 400 begins at block 402 where a first networking device receives data flows. In an embodiment, at block 402, any of the networking devices in the network 200 may forward data flows to any of the other networking devices in the network 200 using a variety of data flow forwarding techniques (e.g., Equal Cost Multi-Path packet routing strategies, etc.) that would be apparent to one of skill in the art in possession of the present disclosure. With reference to FIG. 5A, an embodiment of the networking devices 204, 206, and 208 forwarding data flows to the networking device 202 (as indicated by the bolded arrows) is illustrated. For example, with reference to FIG. 5B, the networking device 202 is illustrated with a plurality of ports 500, 502, and 504 that may each be respective physical ports (also referred to as "non-LAG ports" below) in the communication system 308 of the networking device 202/300, with port 500 receiving a data flow 506, port 502 receiving a data flow 508, and port 504 receiving a data flow 510. Furthermore, FIG. 5B also illustrates the networking device with a plurality of links 512a, 512b, and 512c that may be part of any Link Aggregation Group (LAG) that is provided by one or more physical ports (also referred to as "LAG ports" below) in the communication system 308 of the networking device 202/300, with link 512a receiving a data flow 514, link 512b receiving a data flow 516, and link 512c receiving a data flow 518. In an embodiment, the ports providing the links 512a, 512b, and 512c that receive the data flows 514, 516, and 518 may be members of different LAGs while remaining within the scope of the present disclosure.

Figure 5B:
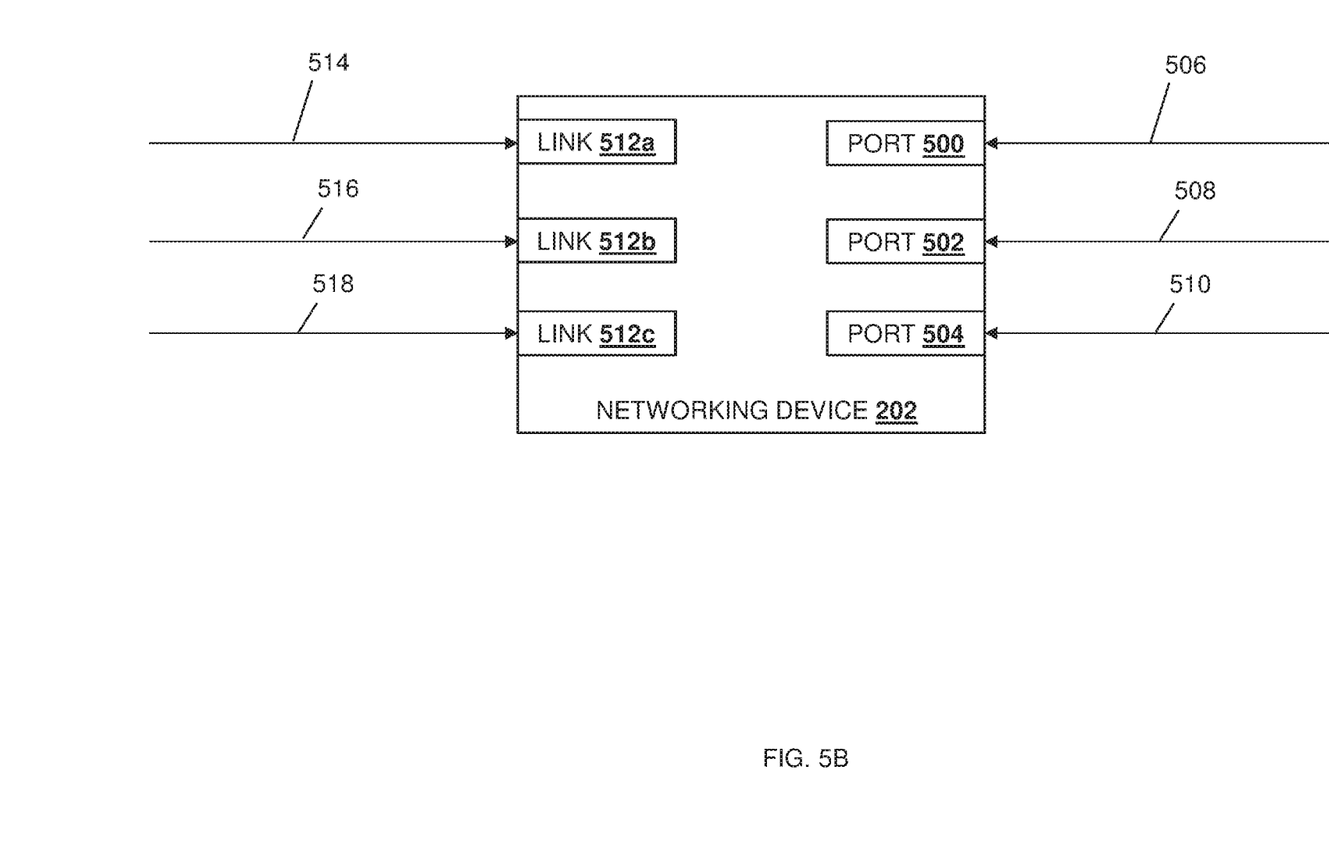
FIG. 5B is a schematic view illustrating an embodiment of a networking device in the buffer shortage management system of FIG. 5A receiving the data flows that are temporarily stored in a buffer pool provided by a buffer.

As would be understood by one of skill in the art in possession of the present disclosure, physical port on a networking device may be aggregated in a LAG to provide a plurality of links that may be utilized to transmit separate data flows to and from that networking device. In a specific example, the LAG port(s) on the networking device 202 that are utilized to provide the links 512a-c in the LAG may be aggregated using Virtual Link Trunking (VLT), an aggregation protocol available from DELL® Inc. of Round Rock, Tex. United States, with those links referred to as "trunks" in VLT that carry that data flows similarly as described below for the links 512a-c. However, one of skill in the art in possession of the present disclosure will recognize that, in some embodiments of the present disclosure, other link aggregation protocols, or the redirection of data flows on non-LAG ports, may fall within the scope of the present disclosure as well.

The method 400 then proceeds to decision block 404 where it is determined whether a total buffer pool utilization has reached a threshold that effects a first data flow received on a non-LAG port. In the examples provided herein, the data flows 506, 508, 510, 514, 516, and 518 illustrated in FIG. 5B are part of a buffer pool provided by the buffer 305 in the networking device 202/300. As would be understood by one of skill in the art in possession of the present disclosure, a buffer pool (or "service pool", "memory pool", etc.) may be a portion of a memory system in the networking device 202/300 that is allocated by a memory manager in the networking device 202/300, and the buffer pool discussed below may be allocated for the data flows 506, 508, 510, 514, 516, and 518 illustrated in the example of FIG. 5B. However, one of skill in the art in possession of the present disclosure will appreciate that networking devices may have more than one buffer pool allocated to any number of data flows and, as such, the operations of the networking device 202 discussed below may be performed for multiple buffer pools and their corresponding data flows while remaining within the scope of the present disclosure.

Figure 5C:
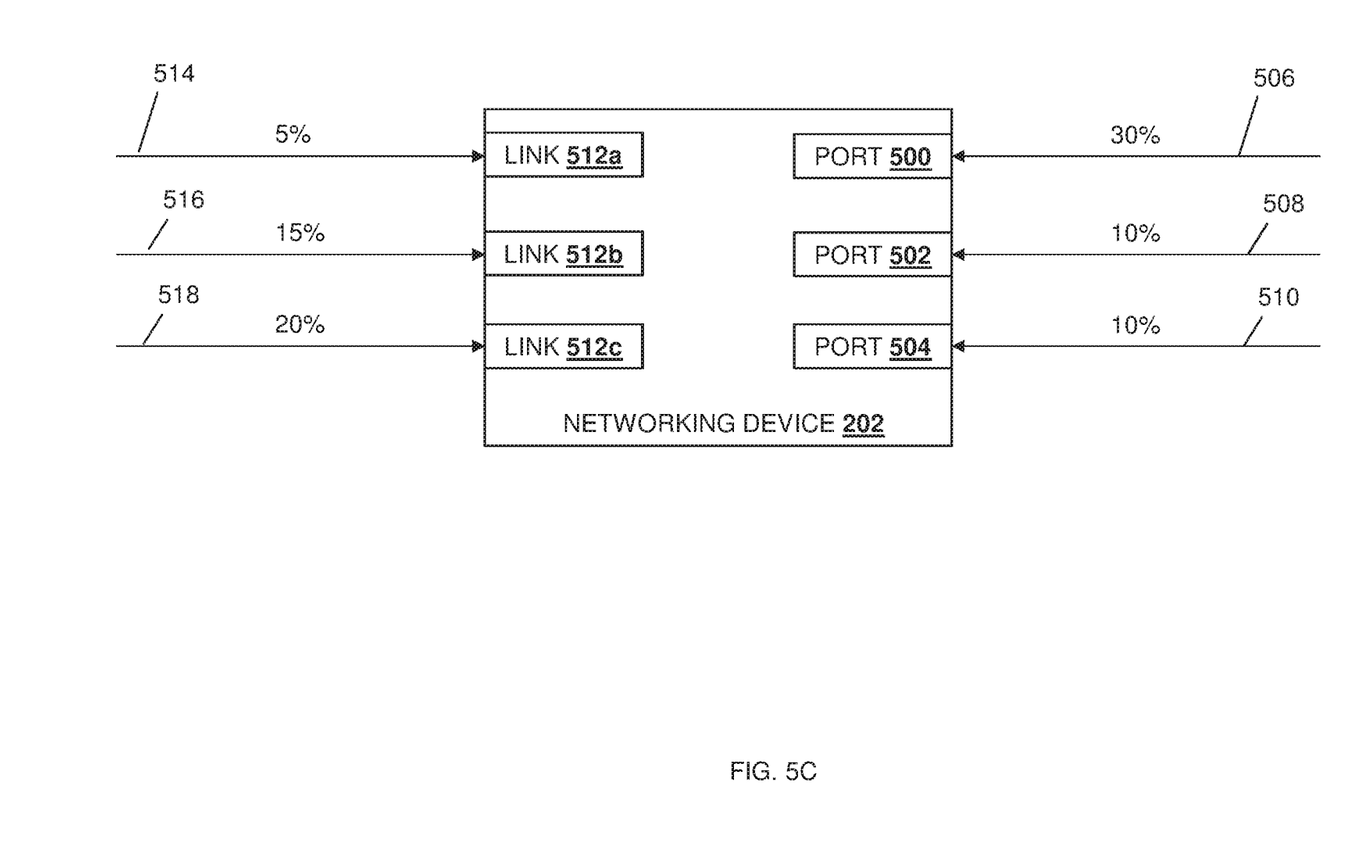
FIG. 5C is a schematic view illustrating an embodiment of the networking device of FIG. 5B showing buffer pool utilization levels for each of its data flows.

As such, in an embodiment of decision block 404, networking devices in the network 200 may monitor their buffers to determine if the buffer pool utilization of any of their buffer pools has reached a total buffer pool utilization threshold that will effect any of the data flows that have their data stored in that buffer pool. Referring to FIG. 5C, a specific example of data flow buffer pool utilization is illustrated that shows: the data flow 506 utilizing 30% of the buffer pool shared with the data flows 508, 510, 514, 516, and 518; the data flow 508 utilizing 10% of the buffer pool shared with the data flows 506, 510, 514, 516, and 518; the data flow 510 utilizing 10% of the buffer pool shared with the data flows 508, 508, 514, 516, and 518; the data flow 514 utilizing 5% of the buffer pool shared with the data flows 506, 508, 510, 516, and 518; the data flow 516 utilizing 15% of the buffer pool shared with the data flows 506, 508, 510, 514, and 518; and the data flow 518 utilizing 20% of the buffer pool shared with the data flows 506, 508, 510, 514, and 516. As discussed below, a total buffer pool utilization threshold for the buffer pool that is shared by the data flows 506, 508, 510, 512, 514, and 518 may be 90% and, as such, the utilizations illustrated in FIG. 5C provide an example of the data flows 506, 508, 510, 514, 516, and 518 reaching that total buffer pool utilization threshold.

Thus, in some embodiments of decision block 404, it may be determined that the total buffer pool utilization has not reached the threshold, and the method 400 will return to block 402. For example, at decision block 404, the buffer shortage management engine 304 in the networking device 202/300 may monitor the buffer pool provided by the buffer 305 for the data flows 506, 508, 510, 514, 516, and 518, determine that its total buffer pool utilization is below 90% and, in response, continue to receive data flows and monitor the total buffer pool utilization of the buffer pool provided by the buffer 305 for the data flows 506, 508, 510, 514, 516, and 518. However, in other embodiments of decision block 404, it may be determined that the total buffer pool utilization has reached the threshold. For example, at decision block 404, the buffer shortage management engine 304 in the networking device 202/300 may monitor the buffer pool provided by the buffer 305 for the data flows 506, 508, 510, 514, 516, and 518, and determine that the total buffer pool utilization of the buffer pool provided by the buffer 305 for the data flows 506, 508, 510, 514, 516, and 518 is at or above 90% (e.g., as illustrated in FIG. 5C) and will effect the data flow 506 received on the non-LAG port 500.

One of skill in the art in possession of the present disclosure will recognize that the individual data flow buffer pool utilizations illustrated in FIG. 5C (e.g., 30% by data flow 506, 10% by data flow 508, 10% by data flow 510, 5% by data flow 514, 15% by data flow 516, and 20% by data flow 518) are all relatively "normal" (e.g., below what is typically defined as a "high" buffer pool utilization), but the total buffer pool utilization (e.g., 90% in this example) is relatively "high", which can result in a disruption in one or more of the data flows 506, 508, 510, 514, 516, and 518. Furthermore, the data flow buffer pool utilization of 30% by the data flow 506 received via the non-LAG port 500 is the highest relative buffer pool utilization by any of the data flows that share the buffer pool, making the data flow 506 the most likely data flow to be disrupted due to the buffer shortage caused by the relatively high total buffer pool utilization. However, existing buffer shortage management system techniques would not trigger any action in this situation, as the individual data flow buffer utilizations remain relatively low, commonly resulting in a disruption of the data flow with the highest relative buffer pool utilization of the buffer pool (e.g., data flow 506 in this example.)

If, at decision block 404, it is determined that the total buffer pool utilization has reached the threshold, the method 400 proceeds to block 406 where the first networking device identifies a second data flow and third data flow(s) that are received on LAG ports. In an embodiment, at block 406, the networking device that determines that a total buffer pool utilization of a buffer pool in its buffer has reached a threshold and will affect a data flow that has its data stored in that buffer pool, and will then identify data flows that may be redirected. For example, the buffer shortage management engine 304 in the networking device 202/300 may identify each of the data flows 514, 516, and 518 that are received via the links 512a, 512b, and 512c, respectively, that are part of the LAG provided by the one or more LAG ports on the networking device 202. For example, at block 406, the buffer shortage management engine 304 may identify the ports on the networking device 202/300 that are part of port channels in a VLT aggregation.

The method 400 then proceeds to block 408 where the first networking device determines that the second data flow has a higher relative utilization of the buffer pool than the third data flow(s). In an embodiment, at block 408, the buffer shortage management engine 304 in the networking device 202/300 may determine which of the second data flow and the third data flow(s), which were identified as received via the LAG at block 406, has the highest relative utilization of the buffer pool provided by the buffer 305. With reference to the example illustrated in FIG. 5C, the buffer shortage management engine 304 in the networking device 202/300 may determine that the data flow 518 received via the link 512c that is part of the LAG has a higher relative utilization of the buffer pool provided by the buffer 305 (e.g., 20% in this example) than the utilization of that buffer pool by the data flow 514 received via the link 512a that is part of the LAG (e.g., 5% in this example) and the data flow 516 received via the link 512b that is part of the LAG (e.g., 15% in this example). However, while a specific example of the selection of a data flow for redirection based on it being received via a LAG and having the highest utilization of the buffer pool relatively to other data flows received via that LAG, one of skill in the art in possession of the present disclosure will recognize that other data flow criteria (e.g., data flow priorities, etc.) may be utilized to determine a data flow to redirect while remaining within the scope of the present disclosure as well.

Figure 5D:
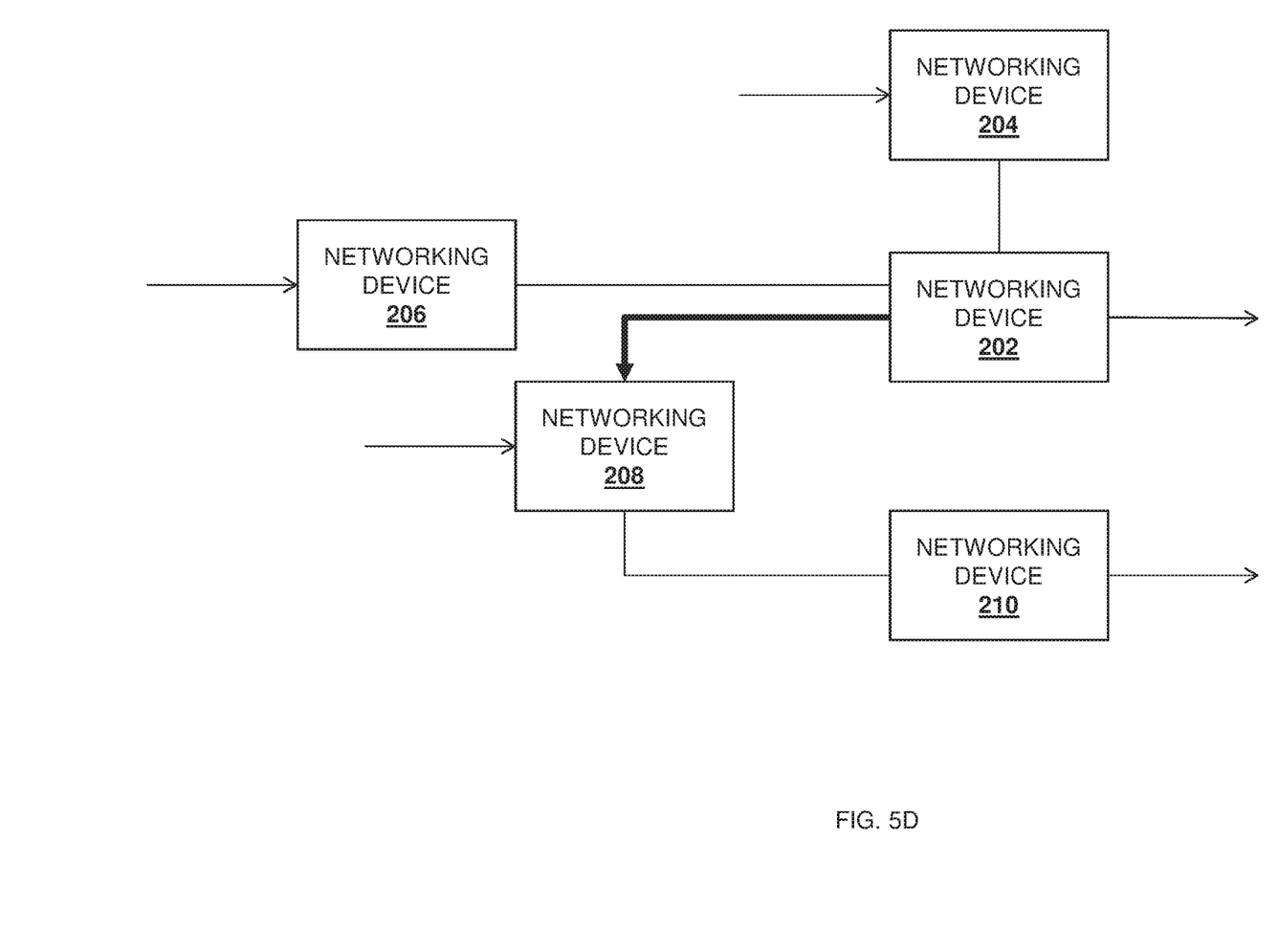
FIG. 5D is a schematic view illustrating a networking device in the buffer shortage management system of FIG. 5A providing another networking device a buffer shortage notification.

The method 400 then proceeds to block 410 where the first networking device sends a first buffer shortage notification to a second networking device. In an embodiment, at block 410, the buffer shortage management engine 304 in the networking device 202/300 may operate to generate a buffer shortage notification and send that buffer shortage notification to the networking device that is forwarding the data flow that was received via the LAG and determined at block 410 to have the highest relatively utilization of the buffer pool relative to the other data flows that are received via the LAG. With reference to FIG. 5D, the networking device 202 is illustrated providing the buffer shortage notification to the networking device 208 (as indicated by the bolded arrow in FIG. 5D.) In embodiment, the buffer shortage notification generated at block 410 may be a single hop tag that may be added to a data packet that will egress a port on the networking device 202/300 and be provided directly to the networking device 208. For example, a data packet that is received by the networking device 202 from the networking device 204 and that is to be forwarded to the networking device 208 on its way to its destination may have the single hop tag that includes the buffer shortage notification added to it so that the buffer shortage notification will be sent to the networking device 208 along with the forwarded data that was received with that data packet (also known as "piggy-backing"). However, in another example, the buffer shortage notification generated by block 410 may be provided in a dedicated data packet generated and sent by the networking device 202 to the networking device 208 while remaining within the scope of the present disclosure as well.

In a specific example, the buffer shortage notification generated by block 410 may include a Class of Service (CoS) bitmap that may be associated with the buffer pool that has had its total buffer pool utilization threshold exceeded. In an embodiment, the CoS bitmap may identify the traffic class that is causing the buffer shortage/congestion, a buffer pool (e.g., a queue in the buffer 305) that is congested, as well as any other information that would provide for the redirection of the data flow 518 as discussed below. In one example, data received in a data flow (e.g., Dot1p, Dscp, etc.) may be mapped to an internal priority traffic class, which may then be mapped to a queue that provides the buffer pool discussed above. As such, a buffer pool/queue identified in a buffer shortage notification allows the data in the associated data flow (e.g., Dot1p, Dscp, etc.) to be identified by the networking device receiving that buffer shortage notification.

In a specific example, the buffer shortage notification generated by block 410 may also include a congestion level indicator that may indicate the level of congestion being experienced by a buffer pool. In an embodiment, the congestion level indicator may identifying the data flow buffer pool utilization (e.g., 20% for the data flow 518 in the example above), the total buffer pool utilization (e.g., 90% in the example above), color indicators for the level of buffer pool utilization (e.g., "GREEN" for relatively low buffer pool utilization, "YELLOW" for increased buffer pool utilization, and "RED" for relatively high buffer pool utilization, etc.). However, one of skill in the art will recognize that the buffer shortage notification may include any information that would provide for the redirection of the data flow 518 described below while remaining within the scope of the present disclosure.

Figure 5E:
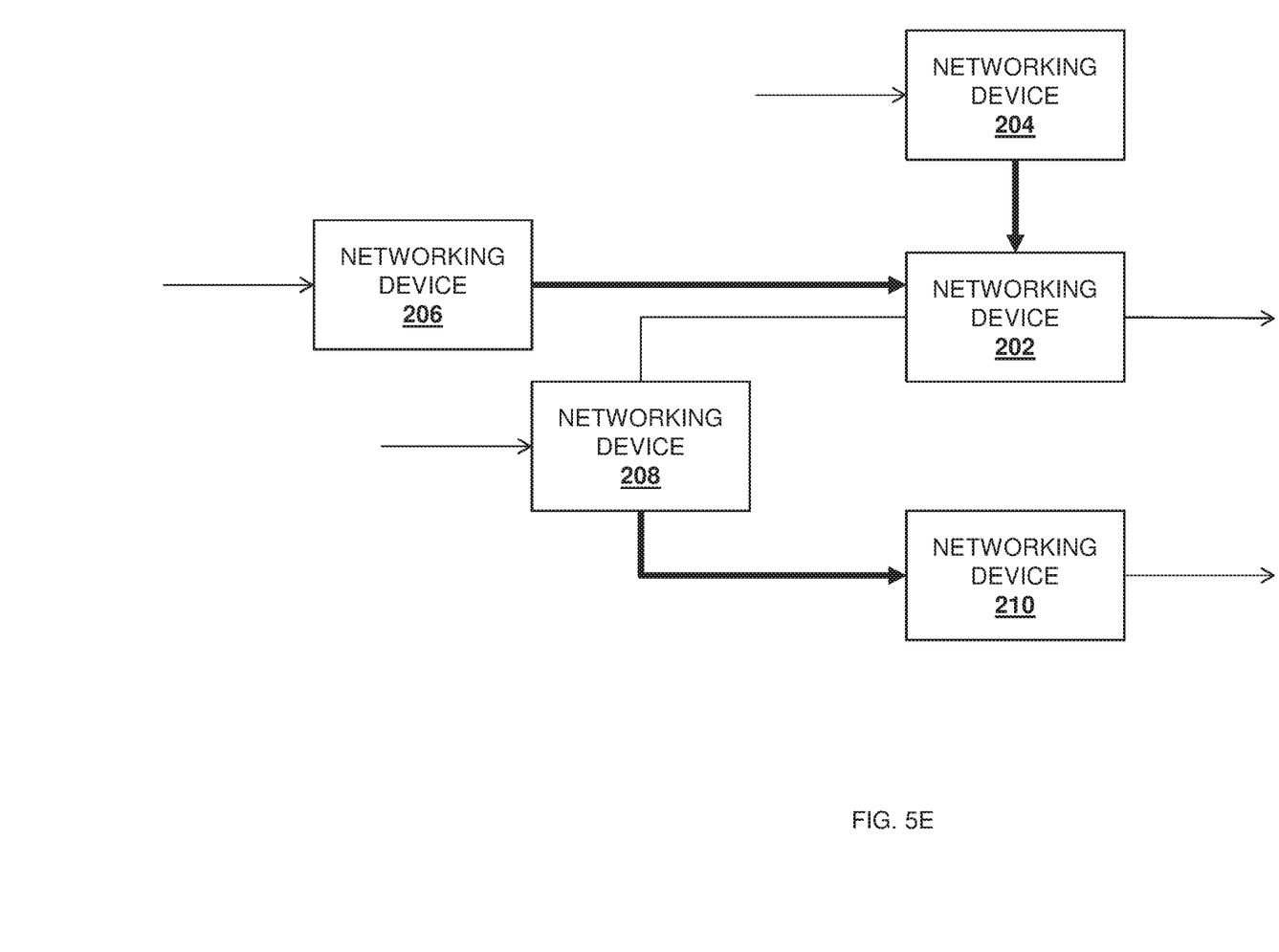
FIG. 5E is a schematic view illustrating an embodiment of data flows in the buffer shortage management system of FIG. 5A following the buffer shortage notification.
Figure 5F:
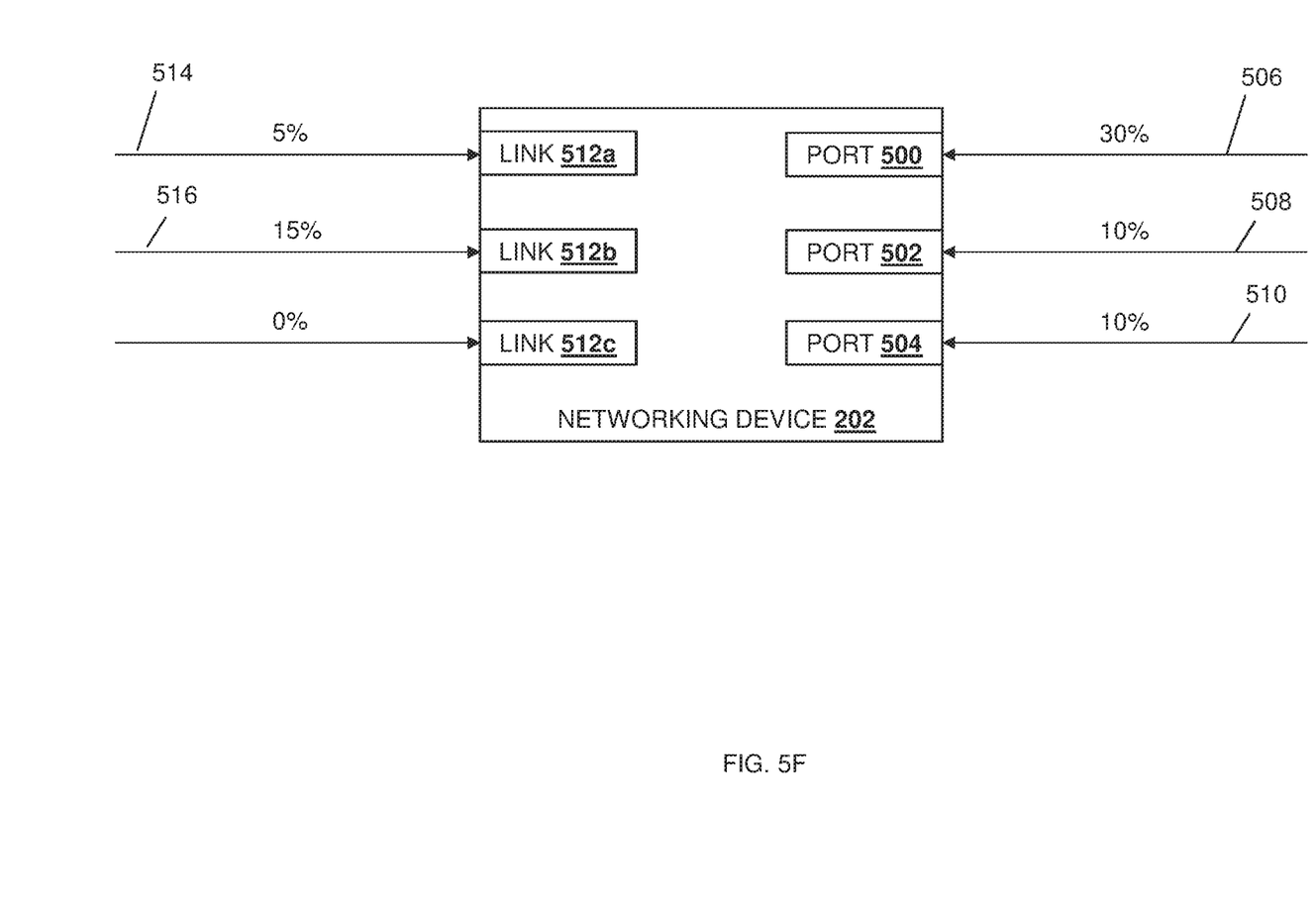
FIG. 5F is a schematic view illustrating an embodiment of the networking device of FIG. 5B showing buffer pool utilization levels for the data flows following the buffer shortage notification.

The method 400 then proceeds to block 412 where the second networking device redirects the second data flow to a third networking device. In an embodiment, at block 412, the buffer shortage management engine 304 in the networking device 204/300 may receive the buffer shortage notification from the networking device 202 and, in response, cause the data flow 518 to be redirected away from the networking device 202. For example, FIG. 5E illustrates how the networking device 208 has redirected its data flow to the networking device 210 (as indicated by the bolded arrow), while the networking devices 204 and 206 continue to direct their data flows to the networking device 202 (as indicated by the bolded arrows). Furthermore, FIG. 5F illustrates how the redirection of the data flow 518 results in a lowered data flow buffer pool utilization via the link 512c (e.g., to 0%), thus lowering the total buffer pool utilization of the buffer pool provided by the buffer 305 in the networking device 202/300 (e.g., to 70% as a result of the buffer pool utilizations of 30%, 10%, 10%, 5%, and 15% by the remaining data flows 506, 508, 510, 514, and 516, respectively.)

In a specific example, at block 412 the buffer shortage management engine 304 in the networking device 208/300 may remove the single hop tag that includes the buffer shortage notification from the data packet that included it and was received at block 410, and identify the CoS bitmap and congestion level indicator included therein. The buffer shortage management engine 304 in the networking device 204/300 may then use the CoS bitmap to identify the data flow 518 based on the mappings discussed above, and identify the egress port on the networking device 204 through which that data flow 518 is currently being forwarded. In some example, the action taken on a data flow handled by the networking device 208/300 by the buffer shortage management engine 304 may depend on the congestion level indicator included in the buffer shortage notification that was received. For example, a congestion level indicator that indicates that the buffer pool utilization is only at a slightly elevated level (e.g., "YELLOW" in the example provided above) may result in a determination to not forward new data flows to the networking device 202, while a congestion level indicator that indicates that the buffer pool utilization is at a relatively high level (e.g., "RED" in the example provided above) may result in a determination to redirect existing data flows from the networking device 202 to a different networking device (e.g., the networking device 210 as illustrated in FIG. 5E).

In an embodiment, the direction of new data flows away from the networking device 202, or the redirection of existing data flows away from the networking device 202, may be accomplished in a variety of manners. For example, the buffer shortage management engine 304 in the networking device 208/300 may accomplish the data flow redirection by performing CoS-based hashing using the CoS bitmap). In another example, the buffer shortage management engine 304 in the networking device 204/300 may accomplish the data flow redirection by modifying the credits associated with a port or link (e.g., connected to the link 512c on the networking device 202 through which the data flow 518 was received) to reduce the change of the subsequent selection of the port/link on the networking device 202 as an optimal member for forwarding a data flow. In another example, the buffer shortage management engine 304 in the networking device 204/300 may accomplish the data flow redirection by installing an Access Control List (ACL) entry that prevents forwarding of the data flow to the networking device 202. However, while a few examples have been provided, one of skill in the art in possession of the present disclosure will recognize that data flows may be redirected in a variety of manners that will fall within the scope of the present disclosure as well.

The method 400 then proceeds to decision block 414 where it is determined whether the third networking device is congested. In an embodiment, at decision block 414, the buffer shortage management engine 304 in the networking device 210/300 may determine whether the total buffer pool utilization of the buffer pool provided by the buffer 305 in the networking device 210/300 is above a buffer pool utilization threshold, similarly as discussed above. If, at decision block 414, it is determined that the third networking device is not congested, the method 400 returns to decision block 414 to monitor for the third networking device for congestion.

If, at decision block 414, it is determined that the third networking device is congested, the method 400 proceeds to block 416 where the third networking device requests a redirect of the second data flow. In an embodiment, at block 416, the buffer shortage management engine 304 in the networking device 210/300 may generate a buffer shortage notification that is substantially similar to the buffer shortage notification discussed above with reference to block 410). The buffer shortage management engine 304 in the networking device 210/300 may then send that buffer shortage notification to the networking device 208 in substantially the same manner as discussed above.

The method 400 then proceeds to block 418 where the second networking device redirects the second data flow to the first networking device. In an embodiment, at block 418, buffer shortage management engine 304 in the networking device 204/300 may, based on the buffer shortage notification received from the networking device 210 at block 416, redirect the data flow 518 from the networking device 210 and back to the networking device 202 in substantially the same manner as discussed above. In one example, the buffer shortage management engine 304 in the networking device 204/300 may accomplish the data flow redirection by performing CoS-based hashing using the CoS bitmap. In another example, the buffer shortage management engine 304 in the networking device 208/300 may accomplish the data flow redirection by modifying the credits associated with a port or link (e.g., connected to the link 512c on the networking device 208 through which the data flow 518 will be redirected) to increase the likelihood it will be selected as an optimal member for forwarding the data flow. In another example, the buffer shortage management engine 304 in the networking device 208/300 may accomplish the data flow redirection by removing an ACL entry that prevented forwarding of the data flow to the networking device 202.

However, while a few examples have been provided, one of skill in the art in possession of the present disclosure will recognize that data flows may be redirected in a variety of manners that will fall within the scope of the present disclosure as well.

Thus, systems and methods have been described that address system wide congestion issues that can affect a particular data flow by modifying the routing of unrelated data flow(s). This may be achieved by a first networking device determining that a total buffer pool utilization of a buffer pool has reached a threshold that affects a first data flow received on a non-LAG port and, in response, identifying a second data flow, from a plurality of data flows that are received on LAG ports, that may be redirected. The first networking device may then transmit a first buffer shortage notification to the second networking device forwarding the second data flow to the first networking device, which causes the second networking device to redirect the second data flow to a third networking device. As such, buffer shortages in a buffer pool that may affect a particular data flow may be remedied by causing connected networking devices to redirect unrelated data flows, eliminating the buffer shortage and ensuring that the particular data flow is not delayed or otherwise negative effected.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A buffer shortage management system, comprising:
    a first networking device that includes:
        a plurality of ports that are part of a buffer pool and that include at least one Link Aggregation Group (LAG) port utilized by a LAG and a non-LAG port; and
        a buffer that is configured to temporarily store data included in data flows that are received via any of the plurality of ports that are part of the buffer pool; and
    a second networking device that is coupled to the first networking device, wherein the second networking device is configured to:
        forward a first data flow to the first networking device via the LAG and through the at least one LAG port based on second networking device forwarding parameters; and
    wherein the first networking device is configured to:
        determine that a total buffer pool utilization of the buffer pool in the buffer, which identifies a utilization of the buffer pool by the first data flow, a second data flow, and at least one third data flow, has reached a first buffer pool utilization threshold that affects the second data flow that is received through the non-LAG port;
        identify that the first data flow and the at least one third data flow are received via the LAG and through the at least one LAG port;
        determine that the first data flow has a higher relative utilization of the buffer pool than any of the at least one third data flows; and
        transmit, in response to determining that the first data flow has a higher relative utilization of the buffer pool than any of the at least one third data flows, a first buffer shortage notification to the second networking device, wherein the second networking device is configured to:
            modify, based on the first buffer shortage notification, the second networking device forwarding parameters to cause the first data flow to be redirected from the first networking device to a third networking device.

2. The system of claim 1, wherein the first buffer shortage notification is provided by the first networking device in a single-hop packet to the second networking device.

3. The system of claim 1, wherein the first buffer shortage notification includes a Class of Service (CoS) bitmap and a congestion level indicator.

4. The system of claim 1, wherein the second networking device is configured to:
    receive, from the third networking device, a request to redirect the first data flow: and
    modify, based on the request, the second networking device forwarding parameters to cause the first data flow to be redirected from the third networking device back to the first third networking device.

5. The system of claim 1, wherein the modification of the second networking device forwarding parameters includes adjusting credits associated with the link from the second networking device to the first networking device.

6. The system of claim 1, wherein the modification of the second networking device forwarding parameters includes adding an Access Control List (ACL) entry associated with the link from the second networking device to the first networking device.

7. An information handling system, comprising:
    a processing system; and
    a memory system that is coupled to the processing system and that includes instructions that, when executed by the processing system, cause the processing system to provide a buffer shortage management engine that is configured to:
        determine that a total buffer pool utilization of a buffer pool in a buffer, which identifies a utilization of the buffer pool by a first data flow, a second data flow, and at least one third data flow, has reached a first buffer pool utilization threshold that affects the first data flow that is received through a non-Link Aggregation Group (LAG) port;
        identify that the second data flow and the at least one third data flow are received via a LAG and through at least one LAG port, wherein the second data flow is received from a connected networking device via the LAG and through the at least one LAG port;
        determine that the second data flow has a higher relative utilization of the buffer pool than any of the at least one third data flows; and
        transmit, in response to determining that the second data flow has a higher relative utilization of the buffer pool than any of the at least one third data flows, a buffer shortage notification to the connected networking device that is configured to cause the connected networking device to redirect the second data flow such that the second data flow is not received via the at least one LAG port.

8. The IHS of claim 7, wherein the first buffer shortage notification is provided in a single-hop packet to the connected networking device.

9. The IHS of claim 7, wherein the first buffer shortage notification includes a Class of Service (CoS) bitmap.

10. The IHS of claim 7, wherein the first buffer shortage notification includes a congestion level indicator.

11. The IHS of claim 7, wherein the first buffer shortage notification is configured to cause the connected networking device to adjust credits associated with the link from the connected networking device to the at least one LAG port.

12. The IHS of claim 7, wherein the first buffer shortage notification is configured to cause the connected networking device to add an Access Control List (ACL) entry associated with the link from the connected networking device to the at least one LAG port.

13. The IHS of claim 7, wherein the first buffer shortage notification is provided in a data packet being forwarded to the connected networking device.

14. A method for managing buffer shortages, comprising:
determining, by a first networking device, that a total buffer pool utilization of a buffer pool in a buffer in the first networking device, which identifies a utilization of the buffer pool by a first data flow, a second data flow, and at least one third data flow, has reached a first buffer pool utilization threshold that affects a first data flow received through a non-Link Aggregation Group (LAG) port on the first networking device;
identifying, by the first networking device, that the second data flow and the at least one third data flow are received via a LAG and through at least one LAG port on the first networking device, wherein the second data flow is received from a second networking device the LAG and through the at least one LAG port;
determining, by the first networking device, that the second data flow has a higher relative utilization of the buffer pool than any of the at least one third data flows; and
transmitting, by the first networking device and in response to determining that the second data flow has a higher relative utilization of the buffer pool than any of the at least one third data flows, a first buffer shortage notification to the second networking device that causes the second networking device to redirect the second data flow to a third networking device.

15. The method of claim 14, wherein the first buffer shortage notification is provided in a single-hop packet to the second networking device.

16. The method of claim 14, wherein the first buffer shortage notification includes a Class of Service (CoS) bitmap and a congestion level indicator.

17. The method of claim 14, further comprising:
receiving, by the second networking device from the third networking device, a request to redirect the first data flow: and
modifying, by the second networking device based on the request, the second networking device forwarding parameters to cause the first data flow to be redirected from the third networking device back to the first third networking device.

18. The method of claim 14, wherein the first buffer shortage notification causes the second networking device to adjust credits associated with the link from the second networking device to the first networking device.

19. The method of claim 14, wherein the first buffer shortage notification causes the second networking device to add an Access Control List (ACL) entry associated with the link from the second networking device to the first networking device.

20. The method of claim 14, wherein the first buffer shortage notification is provided in a data packet being forwarded to the second networking device.

* * * * *